United States Patent
Patel et al.

(10) Patent No.: US 6,405,108 B1
(45) Date of Patent: Jun. 11, 2002

(54) PROCESS AND SYSTEM FOR DEVELOPING PREDICTIVE DIAGNOSTICS ALGORITHMS IN A MACHINE

(75) Inventors: Sagar Arvindbhai Patel, Erie, PA (US); Vinay Bhaskar Jammu, Niskayuna, NY (US)

(73) Assignee: General Electric Company

( * ) Notice: Subject to any disclaimer, the term of this patent is extended or adjusted under 35 U.S.C. 154(b) by 0 days.

(21) Appl. No.: 09/429,381

(22) Filed: Oct. 28, 1999

(51) Int. Cl.$^7$ .......................... G06F 11/22; G06F 11/25
(52) U.S. Cl. .......................... 701/29; 701/19; 701/35; 702/183; 706/913
(58) Field of Search .......................... 701/19, 29, 31, 701/33, 35; 702/183, 185; 706/913

(56) References Cited

U.S. PATENT DOCUMENTS

| | | |
|---|---|---|
| 4,270,174 A | 5/1981 | Karlin et al. |
| 4,463,418 A | 7/1984 | O'Quin, II et al. |
| 4,517,468 A | 5/1985 | Kemper et al. |
| 4,695,946 A | 9/1987 | Andreasen et al. |

(List continued on next page.)

OTHER PUBLICATIONS

Isermann, R.; "Process Fault Diagnosis Based On Process Model Knowledge"; Advanced Information Processing In Automatic Control; Selected papers from THR IFAC/IMACS/IFORS Symposium; Jul. 3, 1989, pp 21–34; XP000949487.

Dicquemare, P.; "Les Nouvezus Equipments De Controle Pour Une Maintenance Predictive Des Vannes"; Revue Generale Nucleaire RGN, FR, Revue General De Lelectricite S.A. Paris, No. 2, Mar. 1, 1998, pp 17–22, XP0007747756.

Data–Tronic Gas Turbine Information And Control System; General Electric Gas Turbine Reference Library; 8 pgs.

*Primary Examiner*—William A. Cuchlinski, Jr.
*Assistant Examiner*—Eric M Gibson
(74) *Attorney, Agent, or Firm*—Carl A. Rowold; Enrique J. Mora; Beusse Brownlee Bowdoin & Wolter PA (57) ABSTRACT

A process and system for developing an algorithm for predicting failures in a system, such as a locomotive, having a plurality of subsystems is provided. The process allows for conducting a failure mode analysis for a respective subsystem so as to identify target failure modes of the subsystem and/or collecting expert data relative to the respective subsystem. The process includes a step for identifying, based on the identified failure modes and/or the collected expert data, one or more signals to be monitored for measuring performance of the respective subsystem. A generating step allows for generating, based on the monitored signals, a predicting signal indicative of the presence of the identified target failure modes in the respective subsystem.

79 Claims, 8 Drawing Sheets

U.S. PATENT DOCUMENTS

| | | | |
|---|---|---|---|
| 4,823,914 A | | 4/1989 | McKinney et al. |
| 4,970,725 A | | 11/1990 | McEnroe et al. |
| 4,977,390 A | | 12/1990 | Saylor et al. |
| 5,113,489 A | | 5/1992 | Cihiwsky et al. |
| 5,123,017 A | | 6/1992 | Simpkins et al. |
| 5,157,610 A | | 10/1992 | Asano et al. |
| 5,210,704 A | | 5/1993 | Husseiny |
| 5,274,572 A | | 12/1993 | O'Neill et al. |
| 5,282,127 A | | 1/1994 | Mii |
| 5,321,837 A | | 6/1994 | Daniel et al. |
| 5,329,465 A | | 7/1994 | Arcella et al. |
| 5,400,018 A | | 3/1995 | Scholl et al. |
| 5,406,502 A | | 4/1995 | Haramaty et al. |
| 5,445,347 A | | 8/1995 | Ng |
| 5,508,941 A | | 4/1996 | Leplingard et al. |
| 5,528,516 A | | 6/1996 | Yemini et al. |
| 5,566,091 A | | 10/1996 | Schricker et al. |
| 5,594,663 A | | 1/1997 | Messaros et al. |
| 5,633,628 A | | 5/1997 | Denny et al. |
| 5,638,296 A | | 6/1997 | Johnson et al. |
| 5,661,668 A | | 8/1997 | Yemini et al. |
| 5,666,534 A | | 9/1997 | Gilbert et al. |
| 5,678,002 A | | 10/1997 | Fawcett et al. |
| 5,737,215 A | | 4/1998 | Schricker et al. |
| 5,742,915 A | | 4/1998 | Stafford |
| 5,806,011 A | * | 9/1998 | Azzaro et al. ................. 701/99 |
| 5,815,071 A | | 9/1998 | Doyle |
| 5,845,272 A | | 12/1998 | Morjaria et al. |
| 5,950,147 A | | 9/1999 | Sarangapani et al. |
| 5,961,567 A | * | 10/1999 | Azzaro et al. ................. 701/99 |
| 6,014,598 A | * | 1/2000 | Duyar et al. ................... 701/29 |
| 6,175,934 B1 | | 1/2001 | Hershey et al. |
| 6,216,066 B1 | | 4/2001 | Goebel et al. |
| 6,243,628 B1 | * | 6/2001 | Bliley et al. ................... 701/29 |
| 6,246,950 B1 | * | 6/2001 | Bessler et al. ................. 701/99 |

* cited by examiner

PROCESS AND SYSTEM FOR DEVELOPING PREDICTIVE DIAGNOSTICS ALGORITHMS IN A MACHINE

BACKGROUND OF THE INVENTION

The present invention relates generally to machine systems, such as locomotives and other systems, having a plurality of subsystems, and, more particularly, to a system and process for developing diagnostics algorithms for predicting impending failures of the subsystems in the locomotive.

As will be appreciated by those skilled in the art, a locomotive is a complex electromechanical system comprised of several complex subsystems. Each of these subsystems is built from components which over time fail. The ability to automatically predict failures before they occur in the locomotive subsystems is desirable for several reasons, such as reducing the occurrence of primary failures which result in stoppage of cargo and passenger transportation. These failures can be very expensive in terms of lost revenue due to delayed cargo delivery, lost productivity of passengers, other trains delayed due to the failed one, and expensive on-site repair of the failed locomotive. Further, some of those primary failures could result in secondary failures that in turn damage other subsystems and/or components. It will be further appreciated that the ability to predict failures before they occur in the various subsystems would allow for conducting condition-based maintenance, that is, maintenance conveniently scheduled at the most appropriate time based on statistically and probabilistically meaningful information, as opposed to maintenance performed regardless of the actual condition of the subsystems, such as would be the case if the maintenance is routinely performed independently of whether the subsystem actually needs the maintenance or not. Needless to say, a condition-based maintenance is believed to result in a more economically efficient operation and maintenance of the locomotive due to substantially large savings in cost. Further, such type of proactive and high-quality maintenance will create an immeasurable, but very real, good will generated due to increased customer satisfaction. For example, each customer is likely to experience improved transportation and maintenance operations that are even more efficiently and reliably conducted while keeping costs affordable since a condition-based maintenance of the locomotive will simultaneously result in lowering maintenance cost and improving locomotive reliability.

Previous attempts to overcome the above-mentioned issues have been generally limited to diagnostics after a problem has occurred, as opposed to prognostics, that is, predicting a failure prior to its occurrence. For example, previous attempts to diagnose problems occurring in a locomotive have been performed by experienced personnel who have in-depth individual training and experience in working with locomotives. Typically, these experienced individuals use available information that has been recorded in a log. Looking through the log, the experienced individuals use their accumulated experience and training in mapping incidents occurring in locomotive subsystems to problems that may be causing the incidents. If the incident-problem scenario is simple, then this approach works fairly well for diagnosing problems. However, if the incident-problem scenario is complex, then it is very difficult to diagnose and correct any failures associated with the incident and much less to prognosticate the problems before they occur.

Presently, some computer-based systems are being used to automatically diagnose problems in a locomotive in order to overcome some of the disadvantages associated with completely relying on experienced personnel. Once again, the emphasis on such computer-based systems is to diagnose problems upon their occurrence, as opposed to prognosticating the problems before they occur. Typically, such computer-based systems have utilized a mapping between the observed symptoms of the failures and the equipment problems using techniques such as a table look up, a symptom-problem matrix, and production rules. Unfortunately, as suggested above, the usefulness of these techniques have been generally limited to diagnostics and thus even such computer-based systems have not been able to provide any effective solution to being able to predict failures before they occur.

In view of the above-mentioned considerations, there is a general need to be able to quickly and efficiently prognosticate any failures likely to occur in any of the subsystems of the machine, while minimizing the need for human interaction and optimizing the repair and maintenance needs of the subsystem so as to be able to take corrective action before any actual failure occurs.

BRIEF SUMMARY OF THE INVENTION

Generally speaking, the present invention fulfills the foregoing needs by providing a process for systematically developing algorithms for predicting failures in a system, such as a locomotive, having a plurality of subsystems. The process allows for conducting a failure mode analysis for a respective subsystem so as to identify target failure modes of the subsystem and/or collecting expert data relative to the respective subsystem. The process further allows for identifying, based on the identified failure modes and/or the collected expert data, one or more signals to be monitored for measuring performance of the respective subsystem. A generating step allows for generating, based on the monitored signals, a predicting signal indicative of the presence of any target failure modes in the respective subsystem.

The present invention further fulfills the foregoing needs by providing a system for developing algorithms for predicting failures in a machine having a plurality of subsystems. The system includes a module, e.g., a programmable module, configured to conduct a failure mode analysis for a respective subsystem so as to identify target failure modes of the subsystem, and/or configured to collect expert data relative to the subsystem. An identifier module is configured to identify, based on the identified target failure modes and/or collected expert data, one or more signals to be monitored for measuring performance of the respective subsystem, and a detection module is coupled to receive the monitored signals for generating a predicting signal indicative of the presence of any target failure modes in the respective subsystem.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
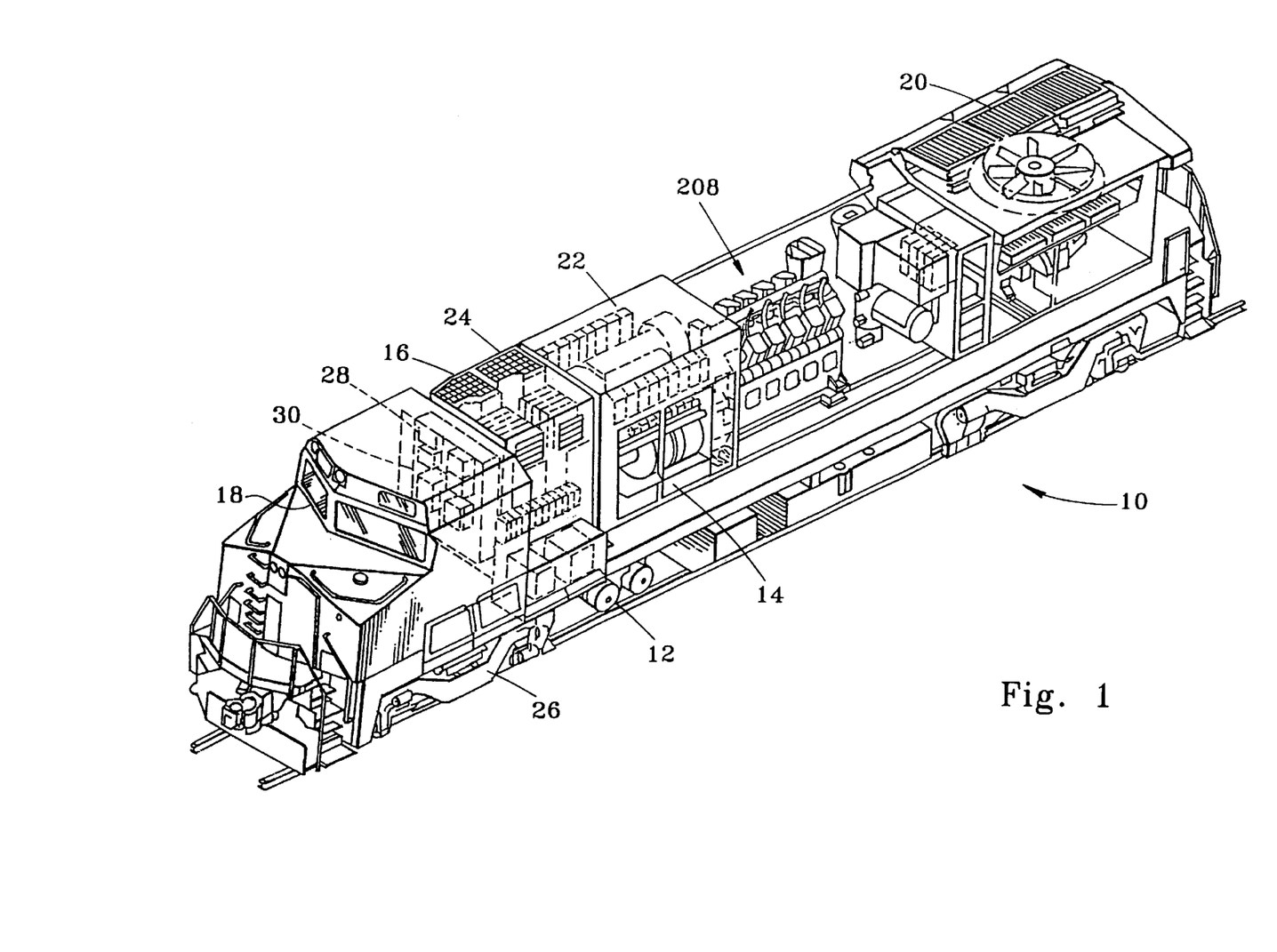
FIG. 1 shows an exemplary schematic of a locomotive.

FIG. 1 shows a schematic of a locomotive 10, that may be either an AC or DC locomotive. As will be appreciated by those skilled in the art, the locomotive 10 is comprised of several relatively complex subsystems, each performing separate functions. By way of background some of the subsystems and their functions are listed below.

An air and air brake subsystem 12 provides compressed air to the locomotive, which uses the compressed air to actuate the air brakes on the locomotive and cars behind it.

An auxiliary alternator subsystem 14 powers all auxiliary equipment. In particular, subsystem 14 supplies power directly to an auxiliary blower motor and an exhauster motor. Other equipment in the locomotive is powered through a cycle skipper.

A battery supplies power to a cranker subsystem 16 to start a diesel engine for operation of a DC bus and a HVAC system. The DC bus in turn provides voltage to maintain the battery at an optimum charge.

A communications subsystem collects, distributes, and displays communication data across each locomotive operating in hauling operations that use multiple locomotives.

A cab signal subsystem 18 links the wayside to the train control system. In particular, the system 18 receives coded signals from the rails through track receivers located on the front and rear of the locomotive. The information received is used to inform the locomotive operator of the speed limit and operating mode.

A distributed power control subsystem provides remote control capability of multiple locomotive-consists anywhere in the train. It also provides for control of tractive power in motoring and braking, as well as air brake control.

An engine cooling subsystem 20 provides the means by which the engine and other components reject heat to the cooling water. In addition, it minimizes engine thermal cycling by maintaining an optimal engine temperature throughout the load range and prevents overheating in tunnels.

An end of train subsystem provides communication between the locomotive cab and the last car via a radio link for the purpose of emergency braking.

An equipment ventilation subsystem 22 provides the means to cool the locomotive equipment.

An event recorder subsystem records FRA required data and limited defined data for operator evaluation and accident investigation. For example, such recorder may store about 72 hours or more of data.

For example, in the case of a locomotive that uses one or more internal combustion engines, such as a diesel engine or prime mover 208 that provides torque to the alternator for powering the traction motors and auxiliary subsystems, a fuel monitoring subsystem provides means for monitoring the fuel level and relaying the information to the crew.

A fuel delivery subsystem provides means for delivering a precisely metered amount of fuel to each cylinder of the engine, e.g., 8, 12, 16 or more cylinders.

A global positioning subsystem uses satellite signals to provide accurate position, velocity and altitude measurements to the control system. In addition, it also provides a precise UTC reference to the control system.

A mobile communications package subsystem provides the main data link between the locomotive and the wayside via a suitable radio (e.g., a 900 MHz radio).

A propulsion subsystem 24 provides the means to move the locomotive. It also includes the traction motors and dynamic braking capability. In particular, the propulsion subsystem 24 receives electric power from the traction alternator and through the traction motors, converts that power to locomotive movement. The propulsion subsystem may include speed sensors that measure wheel speed that may be used in combination with other signals for controlling wheel slip or creep either during motoring or braking modes of operation using control technique well-understood by those skilled in the art.

A shared resources subsystem includes the I/O communication devices, which are shared by multiple subsystems.

A traction alternator subsystem 26 converts mechanical power to electrical power which is then provided to the propulsion system.

A vehicle control subsystem reads operator inputs and determines the locomotive operating modes.

The above-mentioned subsystems are monitored by one or more locomotive controllers, such as a locomotive control system 28 located in the locomotive. The locomotive control system 28 keeps track of any incidents occurring in the subsystems with an incident log. An on-board diagnostics subsystem 30 receives the incident information supplied from the control system and maps some of the recorded incidents to indicators. The indicators are representative of observable symptoms detected in the subsystems. Further background information regarding an exemplary diagnostic subsystem may be found in U.S. Pat. No. 5,845,272, assigned to the same assignee of the present invention and herein incorporated by reference. As suggested above, it is desired to develop a predictive diagnostic strategy that is suitable to predict incipient failures in any of the various subsystems in the locomotive.

Figure 2:
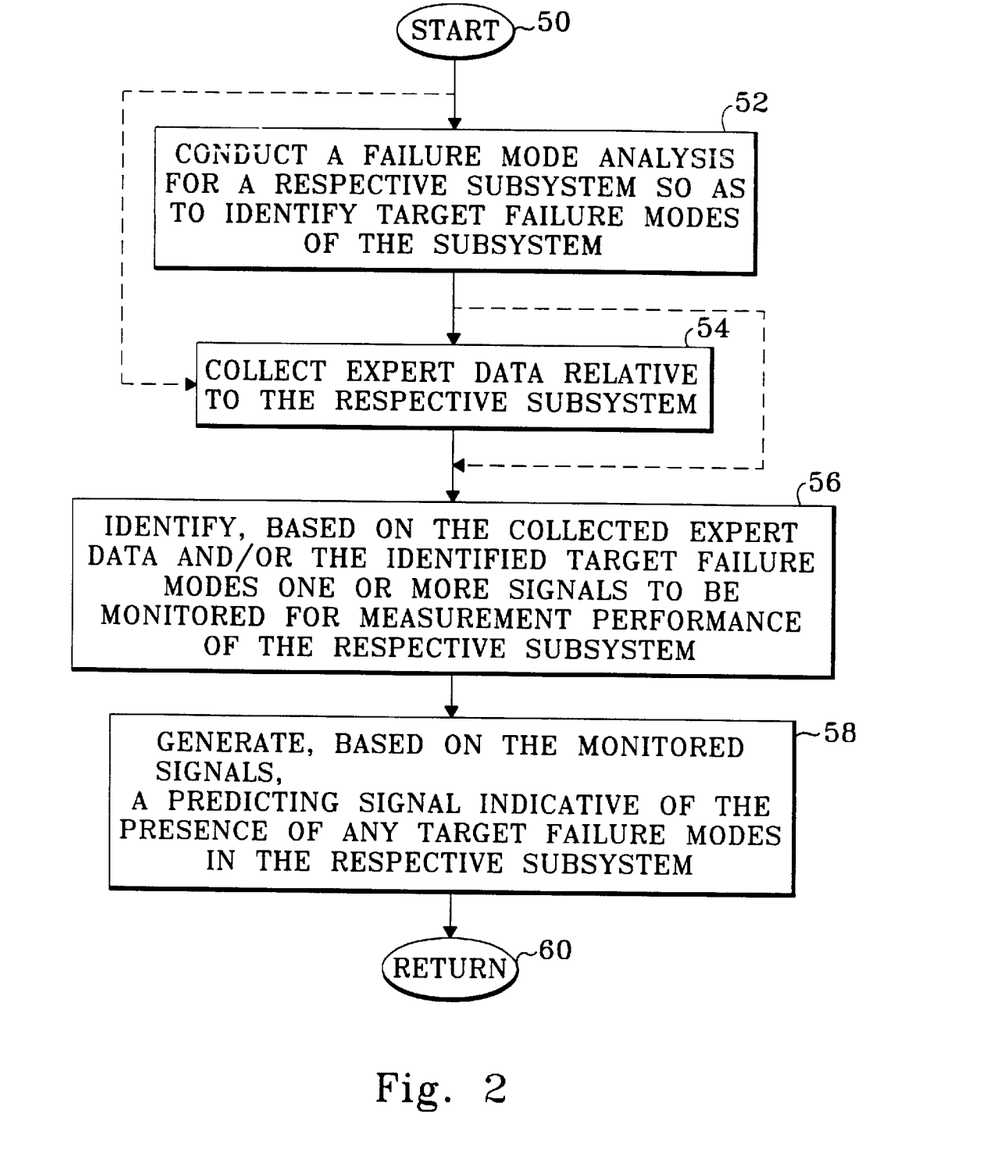
FIG. 2 shows an exemplary flow chart of a process for developing a predictive diagnostics algorithm in the locomotive.

FIG. 2 shows an exemplary flow chart for the process of the present invention that may be used for developing algorithms for predicting incipient failures in the respective subsystems of the locomotive. It will be appreciated that the process of the present invention need not be limited to locomotives since any complex system that generally uses multiple subsystems can readily benefit from the teachings of the present invention. Further, for the sake of brevity and clarity of description, the present invention will be described in the context of a fuel delivery subsystem. It should be understood, however, that the techniques of present invention can be used for any of the various subsystems of the locomotive, such as the engine cooling subsystem, the propulsion subsystem, etc.

Subsequent to start of operations in step 50, step 52 allows for conducting a failure mode analysis for a respective subsystem so as to identify target failure modes of the subsystem. The failure mode analysis may be conducted on previously recorded field data so as to identify high-level failure modes of the respective subsystem. This step conveniently allows a team to focus efforts on the failure modes that offer a substantial potential for improvement by the use of well-known tools, such as Pareto charts and the like. In the case of the fuel delivery subsystem it was found that out of various failure modes that may develop in the fuel delivery subsystem, such as broken or loose bolts, damaged control valve, stator cavitation, valve seat wear, etc., approximately 85% of all fuel delivery subsystem failures could be attributed to stator cavitation and valve seat wear and thus such failure were identified as the target failure modes of the fuel delivery subsystem. Once the target failure modes have been identified, step 54 allows for collecting expert data relative to the target failure modes. The expert data may be collected from a team of experts in any suitable interactive medium such as live meetings or via suitable telecommunications equipment. This step enables to determine various locomotive and/or subsystem level effects, such primary, secondary, and tertiary effects, etc. For example, in the case of a stator cavitation condition in the fuel delivery subsystem, a primary effect may be that the fuel pump fails to deliver any fuel to its associated cylinder. A secondary effect may be that the engine may suffer from a loss of available Horse Power (HP). A tertiary effect may be that the engine controller may be forced to operate the engine at a reduced level from its standard operating point, such as may occur if the engine controller issues an engine command signal at 80% or less of full engine power. The collected expert data and/or the identified failure modes may be used in step 56 to identify one or more signals to be monitored for measuring performance of the respective subsystem. As conceptually represented by the dashed lines in FIG. 2, it will be appreciated that steps 52 and 54 need not be performed sequentially prior to step 56, since one could skip step 52 or step 54, prior to step 56. In other words, one could perform the failure mode analysis and proceed directly to step 56. Similarly, one could proceed directly to step 56 upon collecting the expert data without having to perform the failure mode analysis. Prior to return step 60, step 58 allows for generating, based on the monitored signals, through a detection function, such as a transfer function, a predicting signal indicative of the presence of the identified target failure modes in the respective subsystem.

Figure 3:
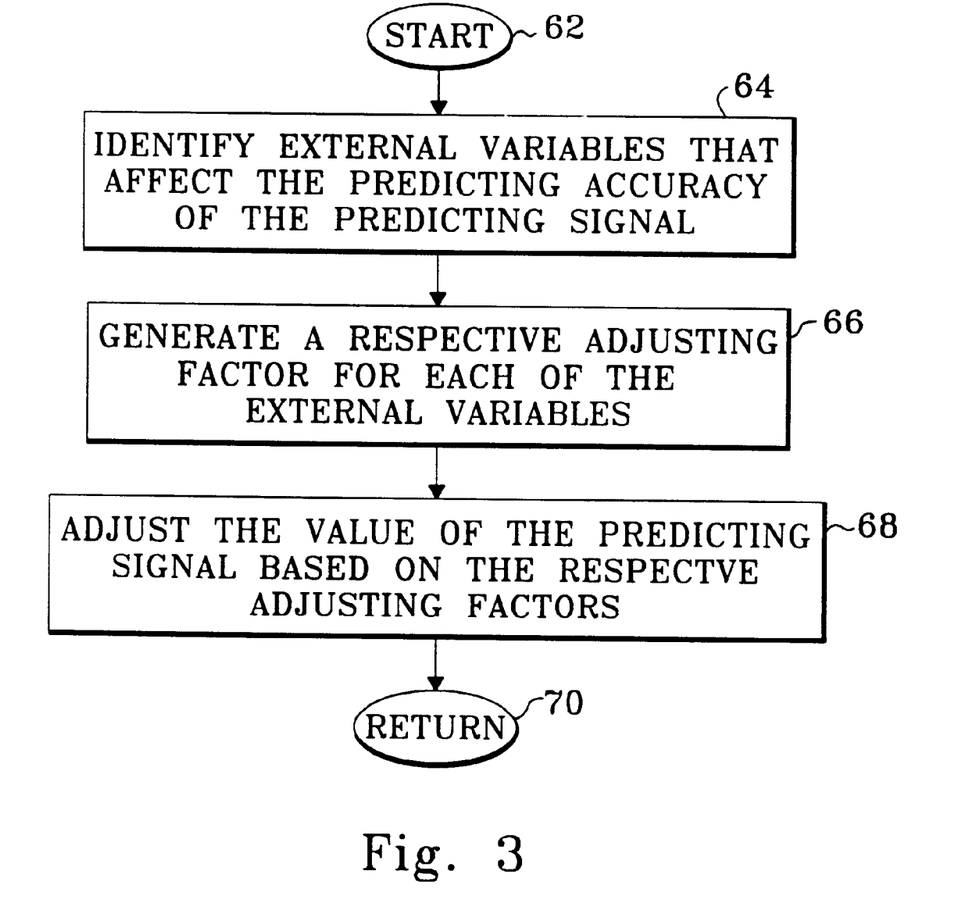
FIG. 3 shows a flow chart illustrating details for enhancing the predictive accuracy of the process of the present invention.

FIG. 3 illustrates an exemplary flow chart of another feature of the present invention that, subsequent to start step 62, in step 64 allows for identifying external variables and other factors that may affect the predicting accuracy of the predicting signal. Examples of such external conditions and factors for a fuel delivery subsystem may include the altitude where the locomotive operates, the ambient temperature, whether the locomotive is traveling in a tunnel since tunnel travel may result in increased operating temperature, locomotive-to-locomotive variation, age of the fuel pump and the type of fuel quality used by the locomotive, such as fuel octane or cetane level or heating value and the like. It will be appreciated that the above-listed external variables are only exemplary since such variables will vary depending on the specific subsystem being analyzed. Step 66 allows for generating a respective adjusting factor for each of the external variables. Prior to return step 70, step 68 allows for adjusting the value of the predicting signal based on the respective adjusting factors. It will be appreciated that adjusting step 68 results in improved detection of incipient subsystem failures in the locomotive since it effectively removes conditions that are not truly indicative of subsystem degradation but may be reflective of temporary conditions, such as may occur during locomotive operation in a substantially straining environment.

Figure 4:
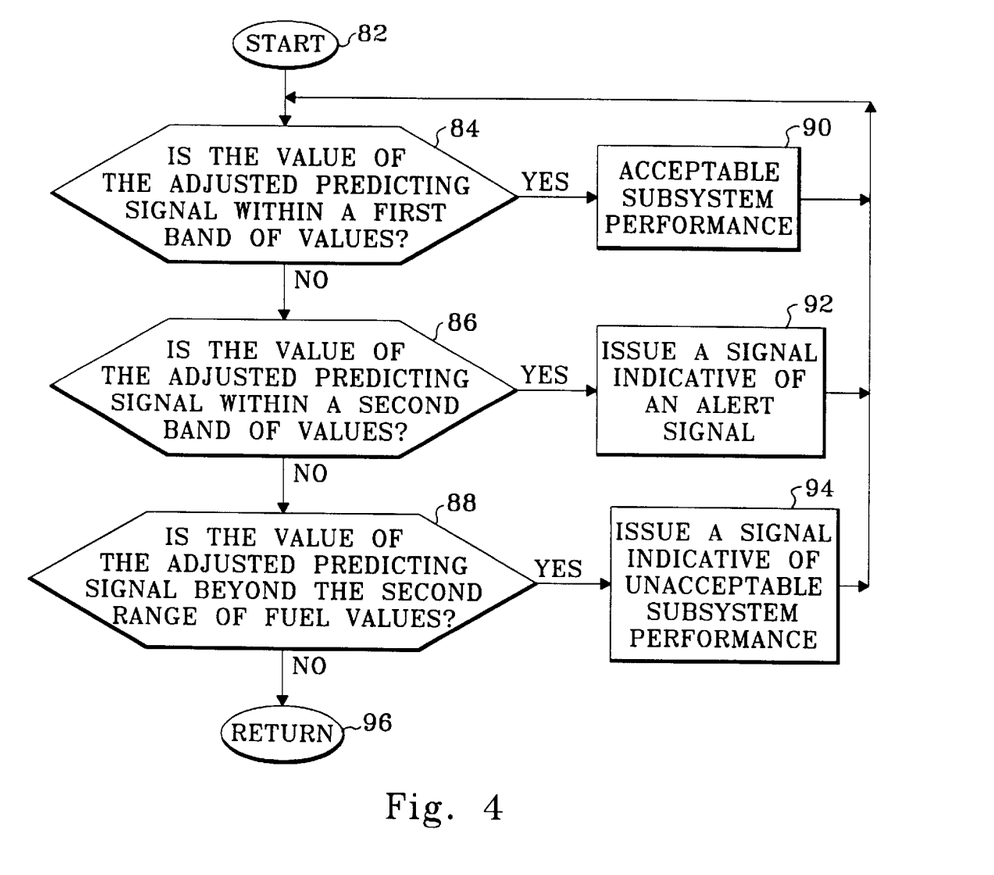
FIG. 4 shows a flow chart illustrating details for assessing the performance of a given locomotive subsystem.

As shown in the flow chart of FIG. 4, upon start of operations at step 82, step 84 allows for determining whether the value of the predicting signal is within a first band of values that may be stored in a programmable memory unit. As further shown in FIG. 4, if the answer is yes, step 90 allows for declaring that subsystem performance is acceptable. If the answer is no, then step 86 allows for determining whether the values of the adjusted predicting signal is within a second band of stored values. If the answer is yes, step 92 allows for issuing a signal that is indicative of an alert status or a warning signal to the user. If the value of the predicting signal is not within the second band of stored values, step 88 allows for determining whether the value of the adjusted predicting signal is beyond the second range of values. If the answer is yes, then step 94 allows for issuing a signal indicative of unacceptable subsystem performance. It will be appreciated by those skilled in the art that the foregoing detection technique is based on monitoring trends in the value of the adjusted predicting signal. It will be appreciated, however, that such detection technique is only one example since, depending on the particular subsystem being evaluated, the detection technique need not be limited to trend detection and other techniques well-understood by those skilled in the art, such as Rule-based, Bayesian Belief, Case-Based Reasoning, etc., could also be employed.

Figure 5:
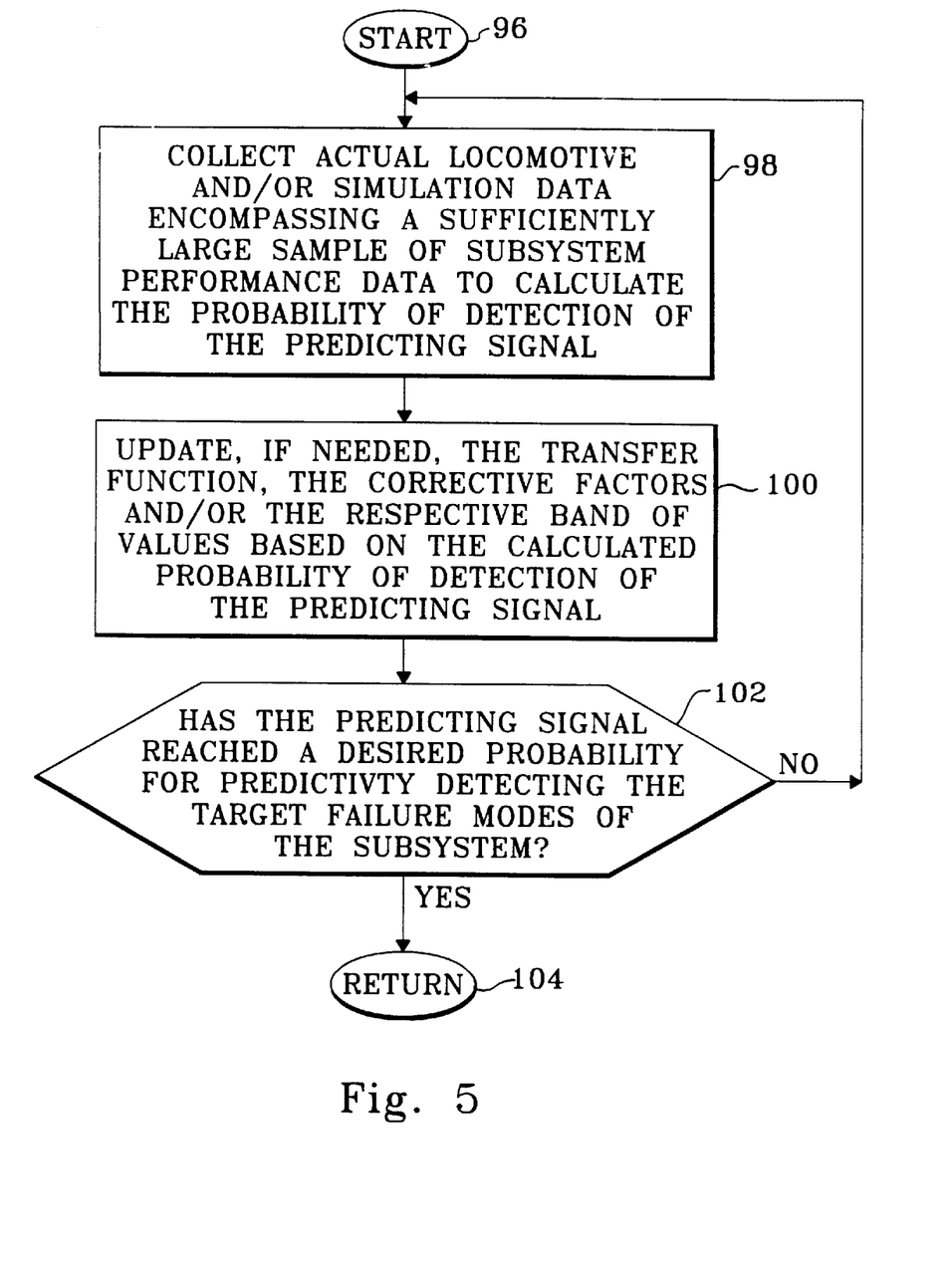
FIG. 5 shows a flow chart illustrating details for "fine tuning" the process of the present invention.

FIG. 5 shows an exemplary flow chart that allows for "fine tuning" or optimizing the method of the present invention. Subsequent to start step 96, step 98 allows for collecting actual locomotive and/or simulation data that preferably encompasses a sufficiently large sample of subsystem performance data to calculate the probability of detection of the predicting signal. This step permits the user to analyze the accuracy of the predicting signal since it will be appreciated that false-positive or false-negative detection, such as may respectively occur when a true failed condition is not detected, or when a failed condition is falsely declared, should be minimized or at least substantially reduced in order for the diagnostics to be of any meaningful value to the user. Step 100 allows for updating so as to "fine tune" or "calibrate", if needed, the transfer function, the corrective factors and/or the respective band of values based on the calculated probability of detection of the predicting signal. Prior to return step 104, step 102 allows the user for deciding whether additional iterations of locomotive and/or simulation data collection or updating of the detection transfer function and other parameters are needed so that the predicting signal reaches a desired probability for predictively detecting the target failure modes of the subsystem. It will be appreciated that depending on the criticality of the particular subsystem involved, the frequency of occurrence of the failure mode, and the relative cost of acquiring the locomotive and/or simulation data and updating the detection algorithm, the user may decide that a respective level of probability that may be acceptable for one subsystem may not be acceptable for another subsystem. An exemplary illustration of the foregoing techniques in the context of the fuel delivery subsystem is provided below.

Figure 6:
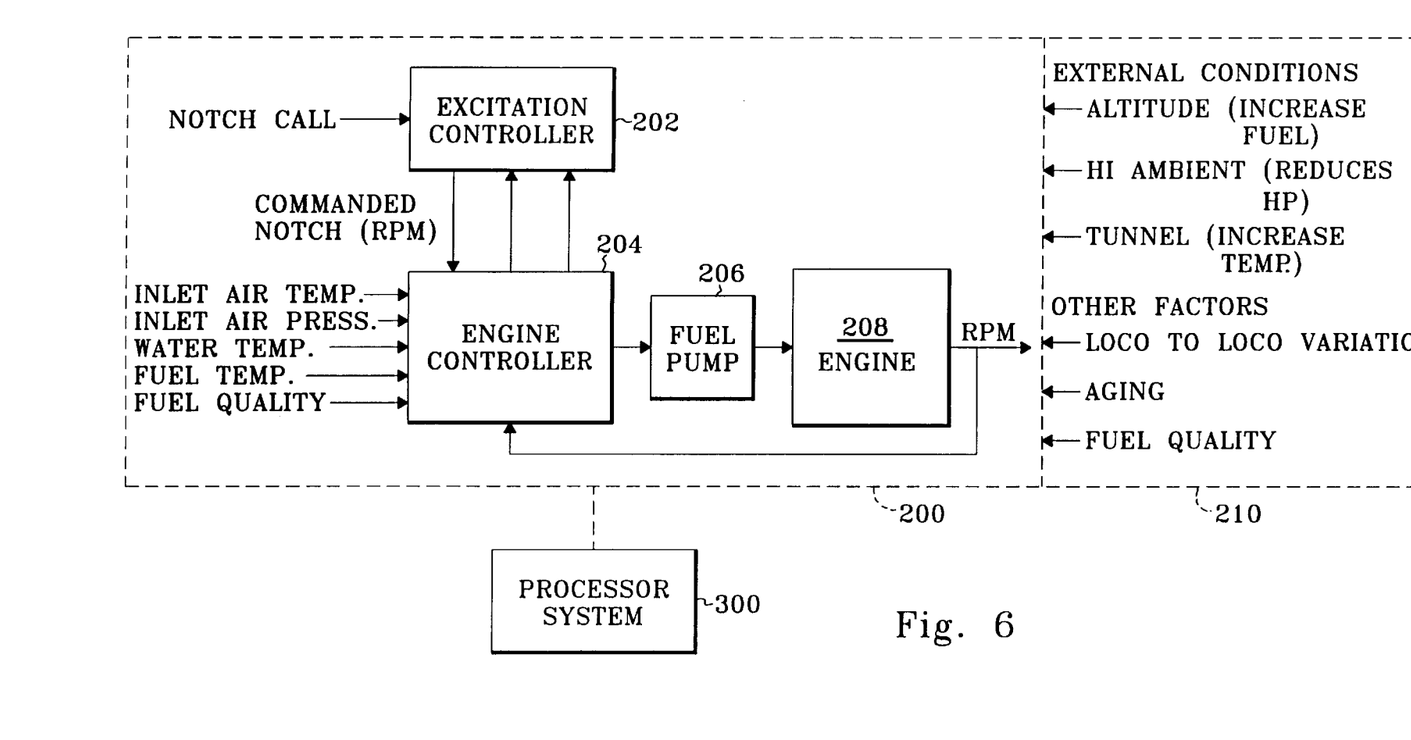
FIG. 6 shows a simplified block diagram of fuel delivery subsystem for illustrating one exemplary application of the process of the present invention.

FIG. 6 shows an exemplary fuel delivery subsystem 200 that includes an excitation controller 202 which is connected to an electronic governor unit (EGU) or engine controller 204. As will be appreciated by those skilled in the art, excitation controller 202 receives a notch call signal, that is, an engine speed command signal from the master controller of the engine and in response to the notch call signal the excitation controller issues a commanded engine RPM signal which is supplied to EGU 54. EGU 204 in turns issues a fuel pump control signal to provide electromechanical control to a high pressure fuel pump 206. Fuel pump 206 in turn is connected to a respective fuel injector to deliver fuel to a given cylinder of engine 208. Engine 208 maybe an internal combustion engine, such as a diesel fuel engine that may have 8, 12, 16 or more cylinders and provides mechanical power to a generator that supplies electrical power to, for example, the traction motors in the locomotive. As will be appreciated by those skilled in the art, a fuel value parameter, that is, the amount of fuel to be delivered into each of the cylinders of the engine is adjusted up or down by the EGU controller in order to maintain constant engine speed as the operating load of the locomotive varies or as the individual fuel pumps wear out or fail, or as the locomotive operates in environmentally demanding conditions, such as substantially low ambient temperature or barometric pressure, or traveling in a tunnel that may result in relatively high ambient temperature, etc. Thus, in this case, based on the expert data, it was determined that an appropriate predicting signal for the fuel delivery subsystem would be the fuel value parameter or value.

As described in further detail below, an estimation of the fuel value calculated by the EGU controller is helpful for determining whether any of the fuel pumps has either failed or has begun to show varying degrees of deterioration. In the event that one or more pumps, singly or in combination, fail to perform within acceptable levels, this condition effectively results in an overall fewer number of pumps available for injecting fuel into engine 208. As suggested above, wear out of various components within the pump may cause the pump to deliver less fuel or may cause the pump not to deliver any fuel to its respective fuel injector. Typical failure modes may include valve seat wear, stator cavitation, loose or broken belts, and other failures. In the event that either of these conditions are present, some of the primary effects may result as previously suggested, in the pump not supplying any fuel, or in supplying a lower amount of fuel than under standard operating conditions. For example, for a notch call signal of eight, a fuel pump may have a rate of fuel delivery of about 1450 cubic millimeters per stroke. It will be appreciated, however, that as the pump wears out, the pump may require more solenoid "on time" to deliver the same amount of fuel due to lower fuel injection pressures across the same physical restriction, such as the diameter of an injector nozzle. It will be appreciated by those skilled in the art that it is desirable to use existing signals that are available without having to add additional sensors to the locomotive. In particular, there is a feedback signal supplied by EGU controller 54 that is indicative of power piston gap and monitoring of this signal, through a suitable transfer function or mathematical relationship, allows for accurately estimating the fuel value based on the following equation:

$$PFV = K_1 - (K_2 \times LVDT), \qquad \text{Eq. 1}$$

wherein K1 and K2 are experimentally and/or empirically derived constants and LVDT is the signal indicative of the power piston gap (PPG) as could be supplied by a displacement transducer. As will be appreciated by those skilled in the art, this is a technique that may be used for measuring the fuel value and is analogous to measuring a throttle valve position. As indicated within block 210 in FIG. 6, there are a number of external conditions and other factors that may affect the actual value of the fuel value actually delivered by fuel pump 206. Examples of such external conditions and factors may include the altitude where the locomotive operates, the ambient temperature, whether the locomotive is traveling in a tunnel since tunnel travel may result in increased operating temperature, locomotive to locomotive variation, age of the fuel pump and the type of fuel quality used by the locomotive, such as fuel octane or cetane level or heating value and the like. Thus, it would be particularly desirable to adjust the value of the monitored PPG signal for deviations from the predicted fuel value obtained from Eq. 1 above. The adjusted fuel value (AFV) may be computed based on the following equation:

$$AFV = PFV / K_{AT} \times K_{BP} \times K_{FT} \times K_{FQ} \times K_{L-L} \times K_{AGE}, \qquad \text{Eq. 2}$$

wherein PFV is the predicted fuel value and $K_{AT}$, $K_{BP}$, $K_{FT}$, $K_{FQ}$, $K_{L-L}$, and $K_{AGE}$ denote a respective corrective or adjusting factor respectively corresponding to the following predetermined external variables: air temperature, barometric pressure, fuel quality, and fuel temperature.

Based on data analysis that has been performed on collected data, it has been found that respective values for each correcting factor may be computed, assuming the indicated units, as follows:

$$(KAT) = 0.0009695 * (\text{Ambient Air Temp. degC.}) + 0.97382 \qquad \text{Eq. 3}$$

$$(KPB) = (750/(25.1 * \text{Baro.Press, in.Hg}))^{\wedge}0.093, \qquad \text{Eq. 4}$$

$$(KFQ) = 137.9/(\text{Fuel Qual.,Btu/Gal}), \qquad \text{Eq. 5}$$

$$(KFT) = (0.0027 * \text{Fuel Temp.degC.}) + 0.9271, \qquad \text{Eq. 6}$$

Since there is not a sensor that directly indicates a measurement of fuel temperature, it has been found that substantially accurate calculation for fuel temperature maybe obtained by correlating engine water temperature and ambient temperature so as to generate a mathematical relationship between the two known variables and fuel temperature. In particular, it has been found that:

$$\text{Predicted Fuel Temp} = A + B(\text{Eng.Water Temp}) + C * (\text{Amb. Temp})^{\wedge} 2 \qquad \text{Eq. 7,}$$

wherein A, B and C respectively represent numerical coefficients that may vary depending on the specific locomotive implementation and that may be readily derived from collected and/or simulated data.

Figure 7:
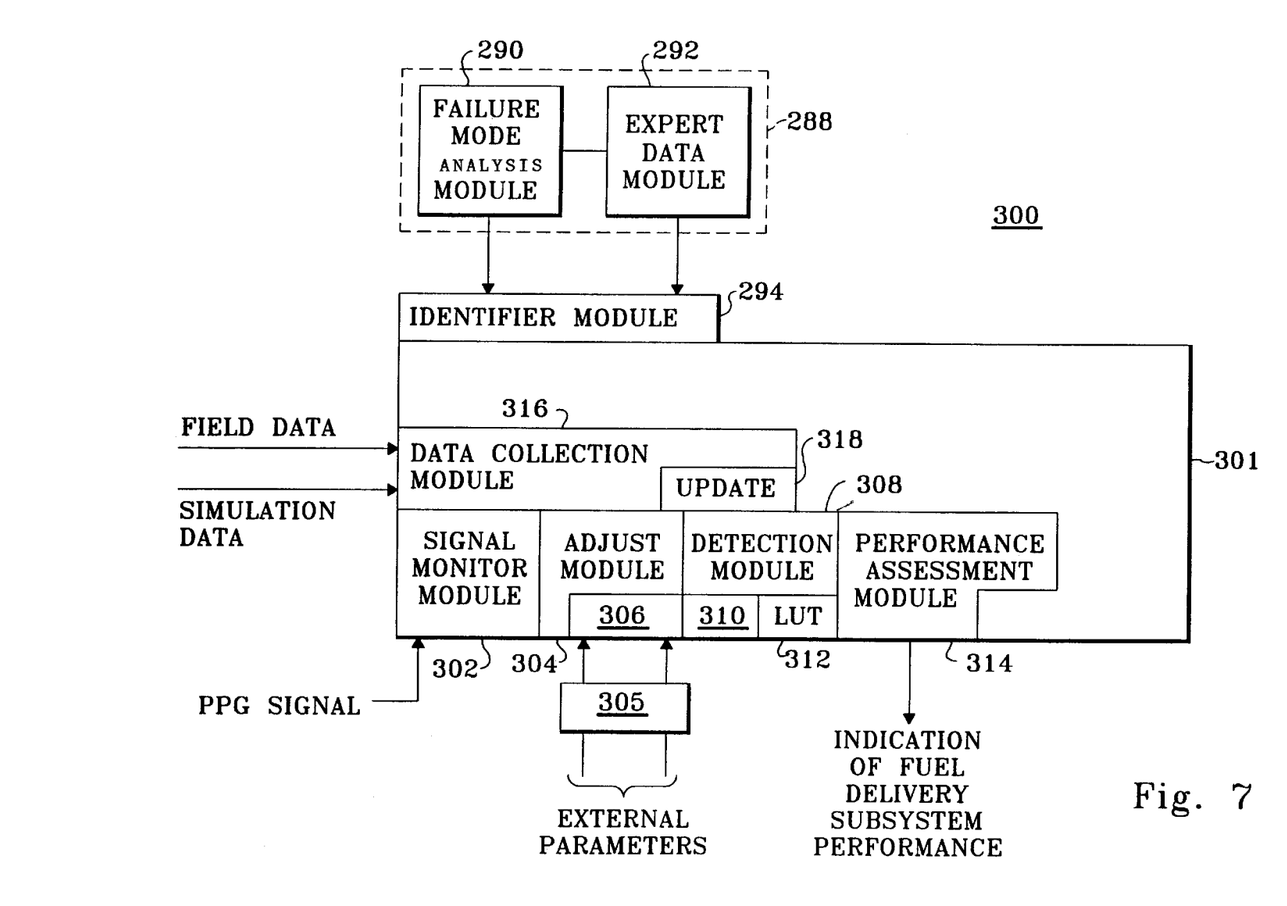
FIG. 7 shows an exemplary block diagram representation of a system that can be used for predicting impending failures in the subsystem of FIG. 6.

A processor system 300 may be coupled or assigned to a respective subsystem, e.g., fuel delivery subsystem 200 to monitor and collect the various signals that in this exemplary case would allow the processor to assess the performance of the fuel delivery subsystem. It will be appreciated that processor system 300 may be installed on-board or could be installed at a remote diagnostics site that would allow a service provider to monitor a fleet of locomotives. By way of example, signal transmission from the locomotive to the diagnostics site could be implemented using a suitable wireless data communication system and the like.

As shown in FIG. 7, and as suggested above in the context of FIG. 2, system 300 may comprise a module 288, e.g., a programmable module, having a submodule 290 that allows for conducting a failure mode analysis for a respective subsystem so as to identify target failure modes of the subsystem. In the case of the fuel delivery subsystem it was found that approximately 85% of all fuel delivery subsystem failures could be attributed to stator cavitation and valve seat wear and thus such failure were identified as the target failure modes of the fuel delivery subsystem. If desired, an expert data module 292 in module 288 allows for collecting expert data relative to the subsystem, for example, the target failure modes of the subsystem. The collected expert data and/or the identified target failure modes may be used by an identifier module 294 to identify one or more signals to be monitored for measuring performance of the respective subsystem. In the case of the fuel delivery subsystem, a processor 301 made up of a signal monitor module 302 receives the signal to be monitored, i.e., the PPG signal, and used for calculating the predicted fuel value (PFV) from Eq. 1.

Processor 301 further includes a module 304 electrically coupled to signal monitor 302 to adjust the monitored signal or signals for deviations from the predicted fuel value due to predetermined external variables, such as may be identified by way of a module 305, to generate the adjusted fuel value (AFV) of Eq. 2. It will be appreciated that other correcting or adjusting factors could be included in Eq. 2 to adjust for other parameters or variables, such as aging of the subsystem, subsystem variation from locomotive-to-locomotive, etc. The adjusting factors may be empirically or experimentally derived by collecting actual data and/or simulation data that takes into account multiple scenarios of locomotive operation, and should preferably include a sufficiently large sample of locomotives and/or fuel delivery subsystems so as to statistically demonstrate the validity and accuracy of the correcting factors and/or transfer function of Eq. 1.

A submodule 306 in module 304 allows for retrieving and/or generating the respective adjusting factors. A detection module 308 is electrically coupled to adjust module 304 to receive the adjusted fuel value, i.e., the value of the adjusted predicting signal. Detection module 308 includes a respective submodule 310 that allows for comparing the value of the adjusted fuel value against a nominal fuel value to determine the performance of the fuel delivery subsystem. A memory unit 312 may be used for storing a programmable look-up table (LUT) for storing a first range or band of fuel values so that adjusted fuel values within that first range or band are indicative of acceptable fuel delivery subsystem performance. The look-up table in memory unit 312 may further be used for storing a second range or band of fuel values so that adjusted fuel values within the second range are indicative of degraded fuel delivery subsystem performance.

A performance assessment module 314 may be readily used for generating and issuing a signal indicative of a degraded fuel delivery subsystem performance when the adjusted fuel value is beyond the first range of fuel values and within the second range of fuel values, that is, a cautionary signal that could be analogized to a yellow light in a traffic light. Similarly, module 314 may be used for generating and issuing a signal indicative of unacceptable fuel delivery subsystem performance when the adjusted fuel value is beyond an upper limit of the second range of fuel values, that is, a warning signal that could be analogized to a red light in a traffic light that requires immediate action by the user, for example, the person evaluating a respective subsystem performance at a remote diagnostic service center or anyone and/or anything else that initiates diagnostic recommendations or actions. An exemplary first range of fuel values may be fuel values ranging from about of about 1450 cubic millimeters per stroke to about of about 1650 cubic millimeters per stroke. An exemplary second range of fuel values may range from about 1650 cubic millimeters per stroke to 1750 cubic millimeters per stroke. Thus, for the above ranges, if the result of Eq. 2, exceeds 1750 cubic millimeters per stroke, then module 314 will issue the red alert signal. Similarly, if the result of Eq. 2, is within the second range of values, then module 314 will issue the yellow cautionary signal. Finally, if the result of Eq. 2, is within the first range of values, then module 314 will conveniently indicate that the status of the fuel delivery subsystem is within acceptable levels of performance. As suggested above in the context of FIG. 5, a data collection module 316 may be used for collecting actual locomotive and/or simulation data encompassing a sufficiently large sample of subsystem performance data so as to calculate the probability of detection of the generated predicting signal. Further, an updating module 318 may be used to update, if needed, the transfer function, the correcting factors and/or the respective bands of values based on the measured probability of detection of the predicted signal. In operation, modules 316 and 318 cooperate so as to assist the user to decide whether additional iterations of locomotive and/or simulation data collection or updating of the detection transfer function and other parameters are needed so that the predicting signal reaches a desired probability for predictively detecting the target failure modes of the subsystem.

Figure 8A:
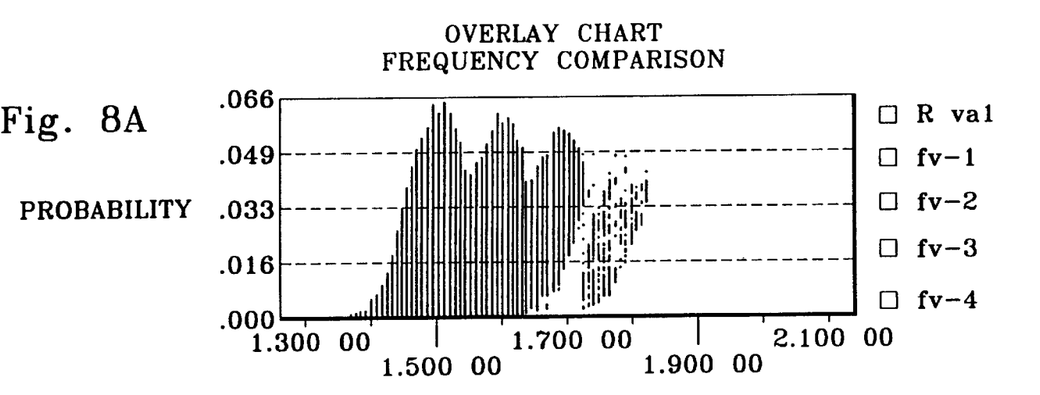
FIGS. 8A and 8B show exemplary probability distribution functions for various failure modes of the fuel delivery subsystem wherein the distribution function of FIG. 7A is uncompensated while the distribution function of FIG. 7B is compensated.
Figure 8B:
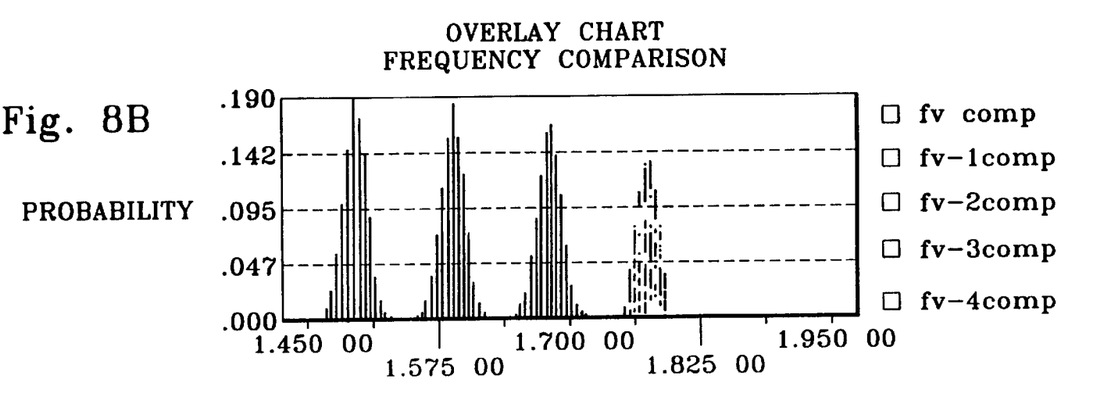

FIG. 8A shows exemplary probability distribution functions in the event that one, two, three, or four fuel pumps become disabled. In particular, FIG. 8A shows the distribution function in the case that fuel values have not been compensated for the various externals variables described above in the context of FIG. 3. By way of comparison, FIG. 8B shows the probability distribution for compensated fuel values in the event that there is a combined loss of one, two, three or four pumps. It will be appreciated that by virtue of the correction that can now be obtained with the present invention, the probability of detecting such multiple failures, singly or in combination, is now substantially improved since as can been in FIG. 8A, there is substantial overlap that may impair detection of such multi-failures whereas in FIG. 8B each respective probability function has a substantially narrow range of deviation that avoids overlap between the respective multiple failed conditions.

As will be appreciated by those skilled in the art, the tightened statistical deviation allows for enhanced and accurate determination of the multiple failures. It will be further appreciated that the multiple fuel pump failures need not directly correspond to a complete pump failure since, for example, the combination of two pumps operating at 50% efficiency may be equivalent to the loss of a single pump. Similarly, the combination of three pumps operating at 66.6% efficiency would be equivalent to the loss of a single pump.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A process for developing algorithms for predicting failures in a machine having a plurality of subsystems, the process comprising:

conducting a failure mode analysis for a respective subsystem based on identifying target failure modes of the subsystem;

identifying, based on the identified failure modes, one or more signals to be monitored for measuring performance of the respective subsystem;

generating, based on the monitored signals, a predicting signal indicative of the presence of any target failure modes in the respective subsystem; and identifying external variables that affect the predictive accuracy of the predicting signal.

2. The process of claim 1 further comprising a step of selecting a respective adjusting factor for each of the external variables.

3. The process of claim 2 further comprising a step of adjusting the value of the predicting signal based on the respective adjusting factors so as to enhance the probability of detection of the identified target failure modes.

4. The process of claim 3 further comprising a step of selecting a first band of values so that adjusted values of the predicting signal within the first band of values are indicative of acceptable subsystem performance.

5. The process of claim 4 further comprising a step for identifying an incipient target failure mode.

6. The process of claim 5 wherein the step for identifying an incipient subsystem failure comprises selecting a second band of values so that adjusted values of the predicting signal within that second band are indicative of degraded subsystem performance.

7. The process of claim 6 further comprising a step of issuing a signal indicative of a cautionary alert of the subsystem when the adjusted values of predicting signal are within the second band of values.

8. The process of claim 7 further comprising a step of issuing a signal indicative of unacceptable subsystem performance when the adjusted values of the predicting signal are beyond an upper limit of the second band of values.

9. The process of claim 3 further comprising a step of collecting at least one type of data selected from the group consisting of actual locomotive data and simulation data, encompassing a sufficiently large sample of subsystem performance data so as to calculate the probability of detection of the generated predicting signal.

10. The process of claim 9 further comprising a step of updating, if needed, at least one of the following: the corrective factors and the respective bands of values, based on the calculated probability of detection of the predicting signal.

11. The process of claim 10 further comprising iteratively executing the collecting and updating steps until the predicting signal reaches a desired probability for predictively detecting the target failure modes of the subsystem.

12. A process for developing algorithms for predicting failures in a system having a plurality of subsystems, the process comprising:

collecting data indicative of failures likely to occur over a life cycle of a respective subsystem;

identifying, based on the collected data, one or more signals to be monitored for measuring performance of the respective subsystem; and generating, based on the monitored signals, a predicting signal indicative of the presence of any target failure modes in the respective subsystem; and identifying external variables that affect the predictive accuracy of the predicting signal.

13. The process of claim 12 wherein the collecting step comprises at least one of the steps of conducting a failure mode analysis for a respective subsystem so as to identify target failure modes of the subsystem and collecting expert data relative to the respective subsystem.

14. The process of claim 12 further comprising a step of selecting a respective adjusting factor for each of the external variables.

15. The process of claim 14 further comprising a step of adjusting the value of the predicting signal based on the respective adjusting factors so as to enhance the probability of detection of the identified target failure modes.

16. The process of claim 15 further comprising a step of selecting a first band of values so that adjusted values of the predicting signal within the first band of values are indicative of acceptable subsystem performance.

17. The process of claim 16 further comprising a step for identifying an incipient target failure mode.

18. The process of claim 17 wherein the step for identifying an incipient subsystem failure comprises selecting a second band of values so that adjusted values of the predicting signal within that second band are indicative of degraded subsystem performance.

19. The process of claim 18 further comprising a step of issuing a signal indicative of a cautionary alert of the subsystem when the adjusted values of predicting signal are within the second band of values.

20. The process of claim 19 further comprising a step of issuing a signal indicative of unacceptable subsystem performance when the adjusted values of the predicting signal are beyond an upper limit of the second band of values.

21. The process of claim 20 further comprising a step of collecting at least one type of data selected from the group consisting of actual locomotive and simulation data, encompassing a sufficiently large sample of subsystem performance data so as to calculate the probability of detection of the generated predicting signal.

22. The process of claim 21 further comprising a step of updating, if needed, at least one of the following: the corrective factors and the respective bands of values, based on the calculated probability of detection of the predicting signal.

23. The process of claim 22 further comprising iteratively executing the collecting and updating steps until the predicting signal reaches a desired probability for predictively detecting the target failure modes of the subsystem.

24. The process of claim 12 wherein the system comprises a locomotive.

25. A system for developing algorithms for predicting failures in a machine having a plurality of subsystems, the system comprising:

a programmable module configured to conduct a failure mode analysis for a respective subsystem by identifying target failure modes of the subsystem;

an identifier module configured to identify, based on the identified target failure modes, one or more signals to be monitored for measuring performance of the respective subsystem;

a module coupled to receive the monitored signals for generating a predicting signal indicative of the presence of any target failure modes in the respective subsystem; and a module configured to identify external variables that affect the predictive accuracy of the predicting signal.

26. The system of claim 25 further comprising a submodule for generating a respective adjusting factor for each of the external variables.

27. The system of claim 26 further comprising a submodule for adjusting the value of the predicting signal based on the respective adjusting factors so as to enhance the probability of detection of the identified target failure modes.

28. The system of claim 27 further comprising a memory unit for storing a first band of values so that adjusted values of predicting signal within the first band are indicative of acceptable subsystem performance.

29. The system of claim 28 further comprising a module for identifying an incipient target failure mode.

30. The system of claim 29 wherein the module for identifying an incipient subsystem failure has a storage means for storing a second band of values of that adjusted values of the predicting signal within that second band are indicative of degraded subsystem performance.

31. The system of claim 30 further comprising a subsystem performance assessment module having a means for issuing a cautionary signal when the adjusted values of the predicting signal are within the second band of values.

32. The system of claim 31 wherein the subsystem performance assessment module has a means for issuing a signal indicative of unacceptable subsystem performance when the adjusted values of the predicting signal are beyond an upper limit of the second band of values.

33. The system of claim 27 further comprising a module for collecting at least one type of data selected from the group consisting of actual locomotive data and simulation data, encompassing a sufficiently large sample of subsystem performance data so as to calculate the probability of detection of the generated predicting signal.

34. The system of claim 33 further comprising an updating module configured to update, if needed, at least one of the following: the correcting factors and the respective bands of values, based on the measured probability of detection of the predicted signal.

35. The system of claim 34 wherein the updating module has a means for iteratively executing the collecting of the at least one type of data, and any needed updates in the update module until the predicting signal reaches a desired probability for predicting the target failure modes of the subsystem.

36. A process for developing algorithms for predicting failures in a machine having a plurality of subsystems, the process comprising:
conducting a failure mode analysis for a respective subsystem based on collecting expert data relative to the respective subsystem;
identifying, based on the collected expert data, one or more signals to be monitored for measuring performance of the respective subsystem;
generating, based on the monitored signals, a predicting signal indicative of the presence of any target failure modes in the respective subsystem; and
identifying external variables that affect the predictive accuracy of the predicting signal.

37. The process of claim 36 further comprising a step of selecting a respective adjusting factor for each of the external variables.

38. The process of claim 37 further comprising a step of adjusting the value of the predicting signal based on the respective adjusting factors so as to enhance the probability of detection of the identified target failure modes.

39. The process of claim 38 further comprising a step of selecting a first band of values so that adjusted values of the predicting signal within the first band of values are indicative of acceptable subsystem performance.

40. The process of claim 39 further comprising a step for identifying an incipient target failure mode.

41. The process of claim 40 wherein the step for identifying an incipient subsystem failure comprises selecting a second band of values so that adjusted values of the predicting signal within that second band are indicative of degraded subsystem performance.

42. The process of claim 41 further comprising a step of issuing a signal indicative of a cautionary alert of the subsystem when the adjusted values of predicting signal are within the second band of values.

43. The process of claim 42 further comprising a step of issuing a signal indicative of unacceptable subsystem performance when the adjusted values of the predicting signal are beyond an upper limit of the second band of values.

44. The process of claim 38 further comprising a step of collecting at least one type of data selected from the group consisting of actual locomotive data and simulation data, encompassing a sufficiently large sample of subsystem performance data so as to calculate the probability of detection of the generated predicting signal.

45. The process of claim 44 further comprising a step of updating, if needed, at least one of the following: the corrective factors and the respective bands of values, based on the calculated probability of detection of the predicting signal.

46. The process of claim 45 further comprising iteratively executing the collecting and updating steps until the predicting signal reaches a desired probability for predictively detecting the target failure modes of the subsystem.

47. A process for developing algorithms for predicting failures in a machine having a plurality of subsystems, the process comprising:
conducting a failure mode analysis for a respective subsystem based on identifying target failure modes of the subsystem, and collecting expert data relative to the respective subsystem;
identifying, based on the identified target failure modes and the collected expert data, one or more signals to be monitored for measuring performance of the respective subsystem;
generating, based on the monitored signals, a predicting signal indicative of the presence of any target failure modes in the respective subsystem; and
identifying external variables that affect the predictive accuracy of the predicting signal.

48. The process of claim 47 further comprising a step of selecting a respective adjusting factor for each of the external variables.

49. The process of claim 48 further comprising a step of adjusting the value of the predicting signal based on the respective adjusting factors so as to enhance the probability of detection of the identified target failure modes.

50. The process of claim 49 further comprising a step of selecting a first band of values so that adjusted values of the predicting signal within the first band of values are indicative of acceptable subsystem performance.

51. The process of claim 50 further comprising a step for identifying an incipient target failure mode.

52. The process of claim 51 wherein the step for identifying an incipient subsystem failure comprises selecting a second band of values so that adjusted values of the predicting signal within that second band are indicative of degraded subsystem performance.

53. The process of claim 52 further comprising a step of issuing a signal indicative of a cautionary alert of the subsystem when the adjusted values of predicting signal are within the second band of values.

54. The process of claim 53 further comprising a step of issuing a signal indicative of unacceptable subsystem performance when the adjusted values of the predicting signal are beyond an upper limit of the second band of values.

55. The process of claim 49 further comprising a step of collecting at least one type of data selected from the group consisting of actual locomotive data and simulation data, encompassing a sufficiently large sample of subsystem performance data so as to calculate the probability of detection of the generated predicting signal.

56. The process of claim 55 further comprising a step of updating, if needed, at least one of the following: the corrective factors and the respective bands of values, based on the calculated probability of detection of the predicting signal.

57. The process of claim 56 further comprising iteratively executing the collecting and updating steps until the predicting signal reaches a desired probability for predictively detecting the target failure modes of the subsystem.

58. A system for developing algorithms for predicting failures in a machine having a plurality of subsystems, the system comprising:
a programmable module configured to conduct a failure mode analysis for a respective subsystem by collecting expert data relative to the subsystem;
an identifier module configured to identify, based on the collected expert data, one or more signals to be monitored for measuring performance of the respective subsystem;
a module coupled to receive the monitored signals for generating a predicting signal indicative of the presence of any target failure modes in the respective subsystem; and
a module configured to identify external variables that affect the predictive accuracy of the predicting signal.

59. The system of claim 58 further comprising a submodule for generating a respective adjusting factor for each of the external variables.

60. The system of claim 59 further comprising a submodule for adjusting the value of the predicting signal based on the respective adjusting factors so as to enhance the probability of detection of the identified target failure modes.

61. The system of claim 60 further comprising a memory unit for storing a first band of values so that adjusted values of predicting signal within the first band are indicative of acceptable subsystem performance.

62. The system of claim 61 further comprising a module for identifying an incipient target failure mode.

63. The system of claim 62 wherein the module for identifying an incipient subsystem failure has a storage means for storing a second band of values of that adjusted values of the predicting signal within that second band are indicative of degraded subsystem performance.

64. The system of claim 63 further comprising a subsystem performance assessment module having a means for issuing a cautionary signal when the adjusted values of the predicting signal are within the second band of values.

65. The system of claim 64 wherein the subsystem performance assessment module has a means for issuing a signal indicative of unacceptable subsystem performance when the adjusted values of the predicting signal are beyond an upper limit of the second band of values.

66. The system of claim 60 further comprising a module for collecting at least one type of data selected from the group consisting of actual locomotive data and simulation data, encompassing a sufficiently large sample of subsystem performance data so as to calculate the probability of detection of the generated predicting signal.

67. The system of claim 66 further comprising an updating module configured to update, if needed, at least one of the following: the correcting factors and the respective bands of values, based on the measured probability of detection of the predicted signal.

68. The system of claim 67 wherein the updating module has a means for iteratively executing the collecting of the at least one type of data, and any needed updates in the update module until the predicting signal reaches a desired probability for predicting the target failure modes of the subsystem.

69. A system for developing algorithms for predicting failures in a machine having a plurality of subsystems, the system comprising:
a programmable module configured to conduct a failure mode analysis for a respective subsystem by identifying target failure modes of the subsystem and collecting expert data relative to the subsystem;
an identifier module configured to identify, based on the identified target failure modes and collected expert data, one or more signals to be monitored for measuring performance of the respective subsystem;
a module coupled to receive the monitored signals for generating a predicting signal indicative of the presence of any target failure modes in the respective subsystem; and
a module configured to identify external variables that affect the predictive accuracy of the predicting signal.

70. The system of claim 69 further comprising a submodule for generating a respective adjusting factor for each of the external variables.

71. The system of claim 70 further comprising a submodule for adjusting the value of the predicting signal based on the respective adjusting factors so as to enhance the probability of detection of the identified target failure modes.

72. The system of claim 71 further comprising a memory unit for storing a first band of values so that adjusted values of predicting signal within the first band are indicative of acceptable subsystem performance.

73. The system of claim 72 further comprising a module for identifying an incipient target failure mode.

74. The system of claim 73 wherein the module for identifying an incipient subsystem failure has a storage means for storing a second band of values of that adjusted values of the predicting signal within that second band are indicative of degraded subsystem performance.

75. The system of claim 74 further comprising a subsystem performance assessment module having a means for issuing a cautionary signal when the adjusted values of the predicting signal are within the second band of values.

76. The system of claim 75 wherein the subsystem performance assessment module has a means for issuing a signal indicative of unacceptable subsystem performance when the adjusted values of the predicting signal are beyond an upper limit of the second band of values.

77. The system of claim 71 further comprising a module for collecting at least one type of data selected from the group consisting of actual locomotive data and simulation data, encompassing a sufficiently large sample of subsystem performance data so as to calculate the probability of detection of the generated predicting signal.

78. The system of claim 77 further comprising an updating module configured to update, if needed, at least one of the following: the correcting factors and the respective bands of values, based on the measured probability of detection of the predicted signal.

79. The system of claim 78 wherein the updating module has a means for iteratively executing the collection of the at least one type of data, and any needed updates in the update module until the predicting signal reaches a desired probability for predicting the target failure modes of the subsystem.

* * * * *